United States Patent [19]
Duffy

[11] Patent Number: 6,084,738
[45] Date of Patent: Jul. 4, 2000

[54] WRITING SERVO INFORMATION TO A DISC DRIVE AT A CONSTANT DENSITY

[75] Inventor: Dennis Daniel Duffy, Oklahoma City, Okla.

[73] Assignee: Seagate Technology, Inc., Scotts Valley, Calif.

[21] Appl. No.: 08/996,326

[22] Filed: Dec. 22, 1997

Related U.S. Application Data

[60] Provisional application No. 60/055,894, Aug. 15, 1997.

[51] Int. Cl.⁷ .................................................. G11B 21/02
[52] U.S. Cl. .............................................................. 360/75
[58] Field of Search .................................. 360/51, 77.08, 360/75

[56] References Cited

U.S. PATENT DOCUMENTS

| | | |
|---|---|---|
| 4,016,603 | 4/1977 | Ottesen . |
| 4,799,112 | 1/1989 | Bremmer et al. . |
| 5,115,358 | 5/1992 | Widney ...................................... 360/75 |
| 5,136,439 | 8/1992 | Weispfenning et al. . |
| 5,193,034 | 3/1993 | Tsuyoshi et al. . |
| 5,262,907 | 11/1993 | Duffy et al. . |
| 5,276,662 | 1/1994 | Shaver, Jr. et al. . |
| 5,422,760 | 6/1995 | Abbott et al. . |
| 5,436,770 | 7/1995 | Muto et al. ................................ 360/51 |
| 5,459,757 | 10/1995 | Minuhin et al. . |
| 5,583,842 | 12/1996 | Wilson et al. . |
| 5,592,340 | 1/1997 | Minuhin et al. . |
| 5,627,843 | 5/1997 | Deng et al. . |
| 5,631,999 | 5/1997 | Dinsmore . |

OTHER PUBLICATIONS

Finch and Moczarny, "Headerless disk formatting: Making room for more date," Data Storage Magazine, Apr. 1997, pp. 51, 52, and 54, vol. 4, No. 5, Pennwell Publishing Co., Tulsa, Oklahoma.

*Primary Examiner*—Paul Loomis
*Assistant Examiner*—Regina Y. Neal
*Attorney, Agent, or Firm*—Crowe & Dunlevy

[57] ABSTRACT

An apparatus and associated method are disclosed for storing servo information on a rotatable disc of a disc drive at a frequency that varies for each track defined on the disc. A servo track writing system is provided which generates a fixed frequency pattern clock signal that indicates the appropriate angular locations on the disc at which the servo information is to be written, and a servo write clock signal having a selectively variable frequency at which the servo information is written. A reset pulse temporarily suspends and restarts the servo write clock signal so as to be in phase with the pattern clock signal at the initiation of the output of the servo information.

15 Claims, 6 Drawing Sheets

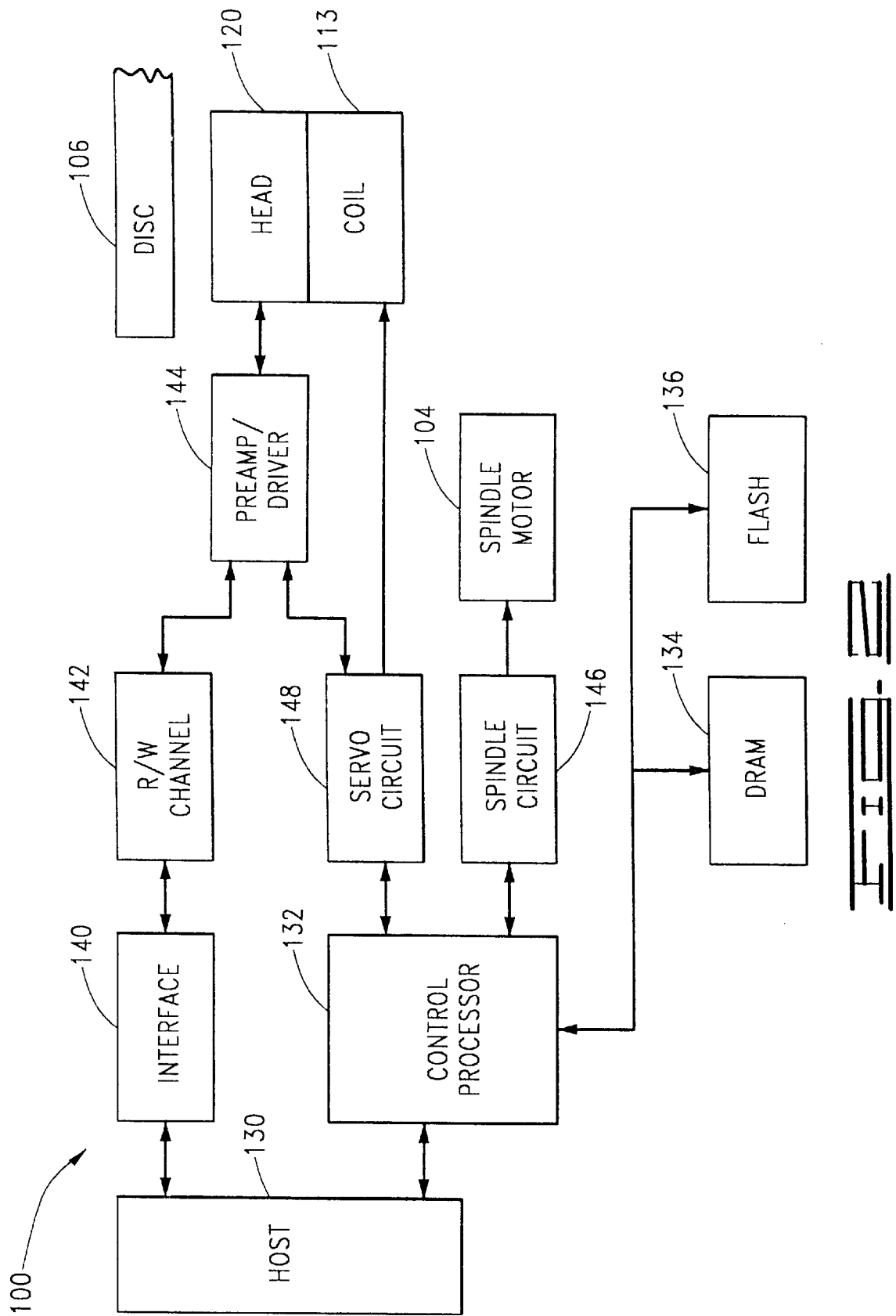

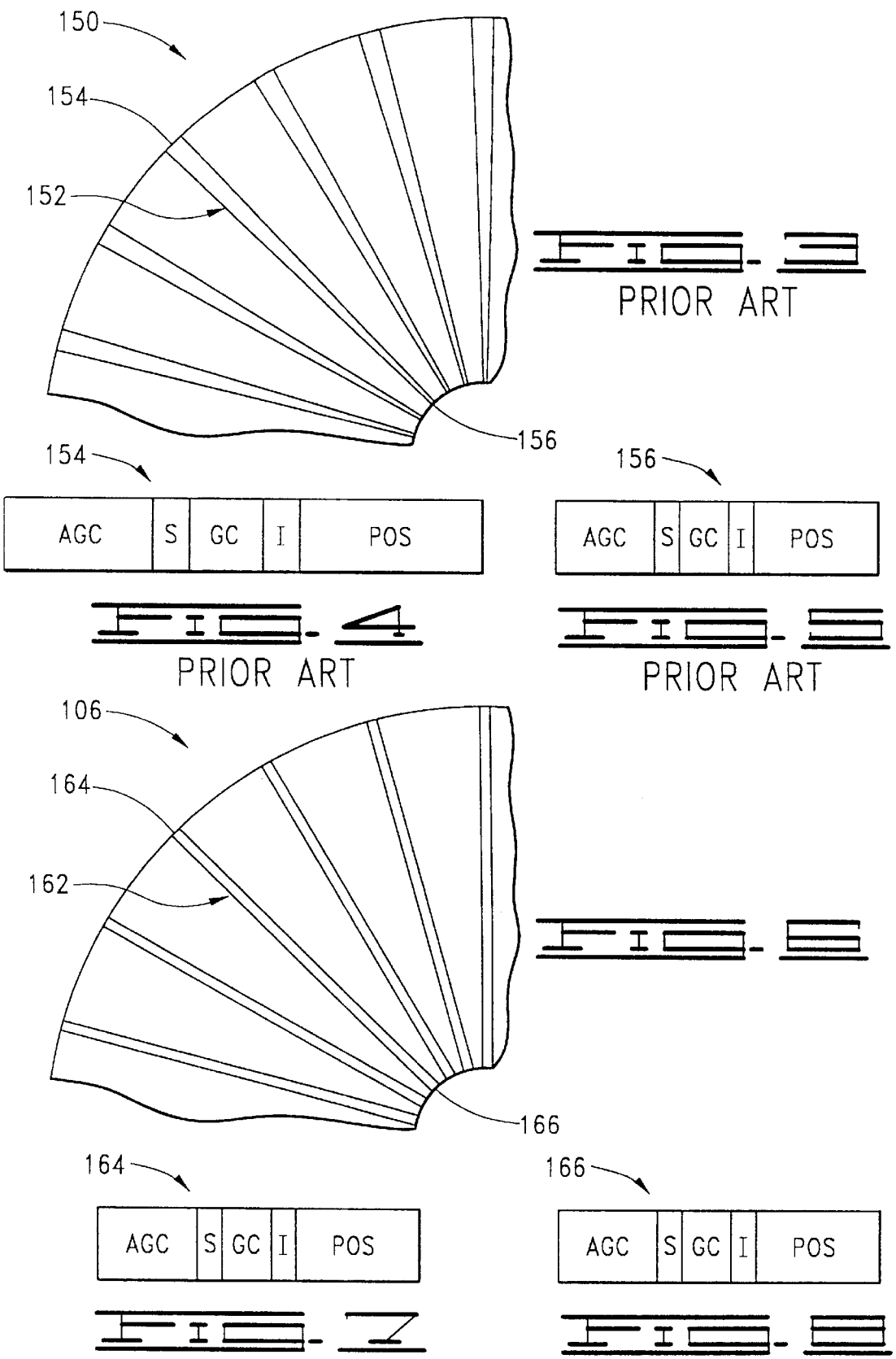

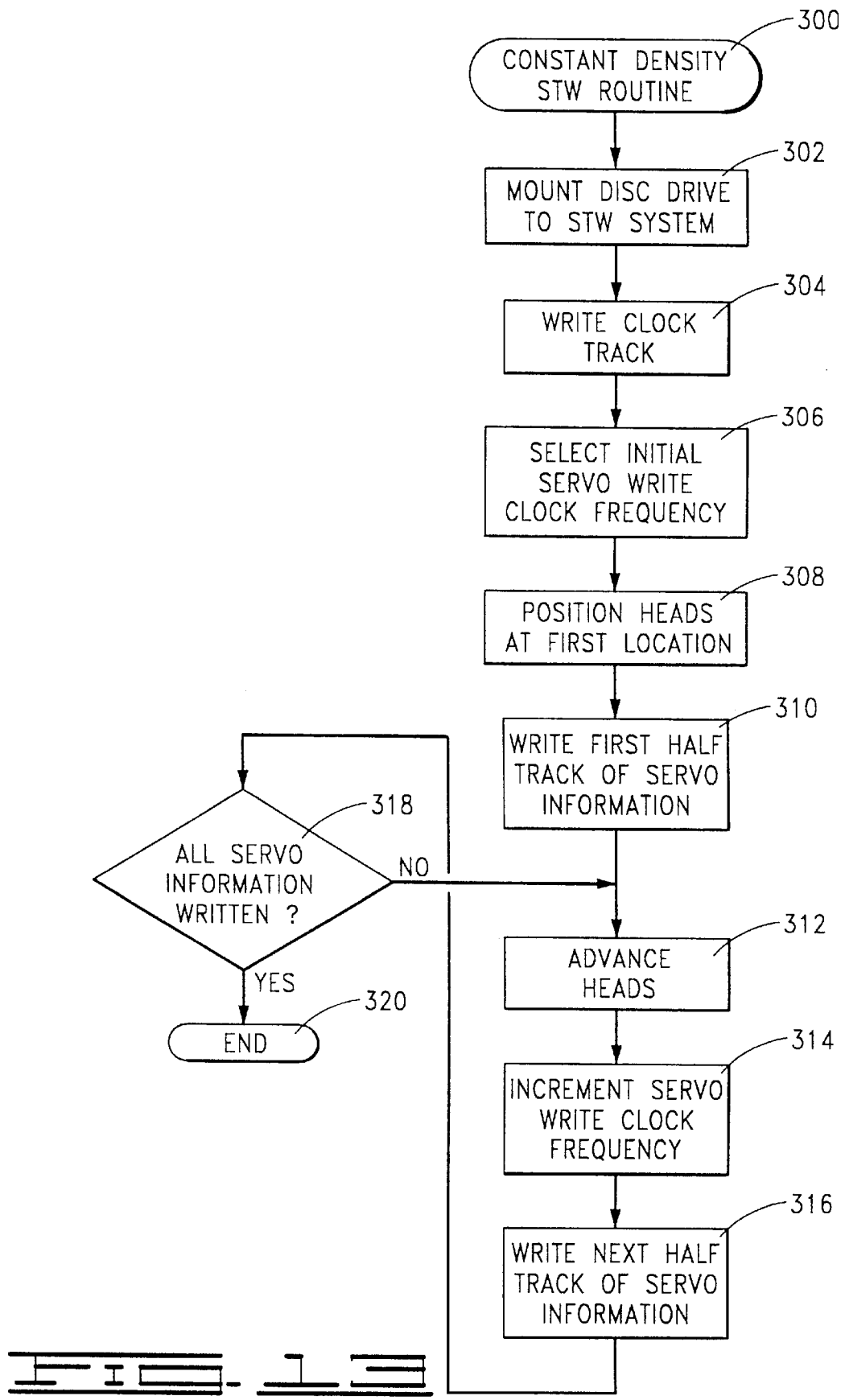

WRITING SERVO INFORMATION TO A DISC DRIVE AT A CONSTANT DENSITY

RELATED APPLICATIONS

This application claims the benefit of United States Provisional Application No. 60/055,894 entitled CONSTANT DENSITY SERVO PATTERN, filed Aug. 15, 1997, and is related to copending U.S. patent application No. 08/995,968 entitled CONSTANT DENSITY SERVO INFORMATION IN A DISC DRIVE, filed concurrently herewith and assigned to the assignee of the present invention.

FIELD OF THE INVENTION

The present invention relates generally to the field of disc drive devices and more particularly, but without limitation, to a servo track writing system for writing servo information to a disc of a disc drive at a frequency that varies for each of the tracks defined on the disc.

BACKGROUND

Hard disc drives are used in modern computer systems to enable users to store and retrieve vast amounts of data in a fast and efficient manner.

In a typical disc drive, one or more magnetic discs are rotated at a constant high speed and accessed by a rotary actuator assembly having a plurality of read/write heads that fly adjacent the surfaces of the discs on air bearings established by air currents set up by the rotation of the discs. Each head includes a write element that selectively magnetizes data fields defined on tracks on the corresponding disc surface during a write operation, and a read element that detects the selective magnetization of the data fields during a read operation. A read/write channel and an interface circuit, responsive to the heads, are provided to transfer the data between the discs and a host computer in which the disc drive is mounted.

A closed loop digital servo system is used to control the position of the heads relative to the tracks through the application of current to a coil of a voice coil motor. The tracks are defined from servo information written to servo fields on the surfaces of the discs during manufacturing using a highly precise servo track writer. The servo information is stored in a series of servo fields, the leading edges of which are radially aligned on each of the surfaces of the discs so as to define servo wedges which outwardly extend from the inner radii of the discs like spokes of a wheel. The data fields are subsequently arranged between adjacent servo fields during a disc drive formatting operation. Typical disc drives generally provide from about 30 to 90 servo wedges on each disc surface.

The servo information typically includes automatic gain control (AGC), synchronization, track address, radial position (index) and position information stored in associated fields, with the AGC and synchronization information providing timing and amplitude inputs, the track address information indicating the radial position of the heads, the index information indicating the angular position of the heads with respect to the discs and the position information indicating the position of the heads with respect to the center associated tracks on the discs. Thus, during normal disc drive operation, the servo information is periodically sampled to enable the servo system to control the position of the heads to properly effectuate the transfer of data between the data fields and the host computer.

The frequency at which the data are written to the data fields is selected to be as high as practicable in order to maximize the data transfer characteristics of the disc drive. The use of magneto-resistive (MR) heads and partial response, maximum likelihood (PRML) read channel detection techniques have allowed disc drives of the present generation to write and read data at frequencies of up to 200 megahertz (MHZ). Typically, however, the servo information is written at a substantially lower frequency, such as 20 MHZ. This reduction in the frequency at which servo information is written is due to a variety of considerations, including the fact that the retrieval of data is accomplished primarily through detecting the presence (or absence) of flux transition pulses from the media; compensation for the effects of factors such as noise and intersymbol interference can hence be sufficiently employed to decode the data, even when the readback pulses are adjacently disposed. By contrast, proper operation of the servo system requires accurate determination of pulse location and amplitude of the servo information which is typically difficult to accurately detect in the presence of noise and interference characteristic of information written at the higher frequencies used to store and retrieve the user data.

Most prior art disc drives have servo information that is written at the same frequency for each of the tracks on the discs. As mentioned above, this results in the servo information being arranged as a plurality of wedges that are wider at the outer radii as compared to the inner radii of the discs (i.e., servo fields written at the outer radii are physically larger than servo fields at the inner radii of the discs). Although such an approach is relatively easy to implement and control, the optimum frequency for the recovery of the servo information by the servo system is not necessarily constant, but rather varies in relation to the radii of the discs.

Generally, the optimum frequency for servo recovery is determined by the pulse width characteristics of the head (such as, for example, PW50, which is a measure of pulse width with respect to amplitude) and the magnetic grain size of the media. At too high a frequency the recording characteristics of the media become non-linear which adversely increases noise in the servo readback signal; at too low a frequency the pulses are too narrow, resulting in a low signal to noise ratio. Thus, the constant frequency at which servo information is written is usually selected to ensure adequate readback performance over the entire radii of the discs and to accommodate other factors, such as alternating current (AC) coupling characteristics of the heads.

Some prior art disc drives, have been disclosed having servo information arranged in a plurality of radially defined zones on the discs, each zone comprising a selected band of tracks to which user data are stored in data fields ("sectors") of substantially equal circumferential length. Examples of such prior art disc drives are provided in, for example, U.S. Pat. No. 4,016,603 issued Apr. 5, 1977 to Ottesen (hereinafter "Ottesen '603") and U.S. Pat. No. 5,193,034 issued Mar. 9, 1993 to Tsuyoshi et al. (hereinafter "Tsuyoshi '034").

Ottesen '603, a relatively early disc drive patent, arranges the servo information into a different number of constant-frequency servo wedges in each of the zones, with the servo wedges in one zone radially offset from the servo wedges in the next, adjacent zone. Although operable, Ottesen '603 has a number of associated problems, including relative difficulty in ensuring proper write protection for each of the servo wedges (which are scattered over the surfaces of the discs), the requirement for an external index generator so that absolute angular position can be determined and maintained (Ottesen '603 employs a tachometer), and the potential for loss of servo control when a selected head is moved to adjacent tracks disposed on either side of a selected zone boundary.

Tsuyoshi '034 also discloses zone based recording, but radially aligns the servo information so as to provide continuously extending servo wedges across the surfaces of the discs, as in the other prior art disc drives discussed above. Particularly, the servo information is written as a plurality of radially extending wedges across each of the zones, the wedges having increased widths at the outer diameters of the discs. While Tsuyoshi '034 extends the servo information across the boundary regions between adjacent zones in order to address the zone boundary control problems associated with Ottesen '603, and writes some of the servo information at a different frequency (on a zone basis) in order to subsequently optimize the writing of the user data to the sectors in each zone, Tsuyoshi '034 still requires substantially the same disc surface overhead for the servo information as is common in the prior art.

Accordingly, as data storage densities continue to increase, there remains a continual need for improvements in the art whereby greater levels of disc drive servo performance and data storage capacities can be achieved.

SUMMARY OF THE INVENTION

The present invention is directed to an apparatus and method for writing servo information to a disc drive at a continuously varying frequency.

In accordance with a preferred embodiment, the disc drive comprises a rotatable disc upon which the servo information is stored, the servo information used to control the position of an associated head with respect to tracks defined on the disc.

The servo information is written at a frequency that varies for each track so as to achieve a substantially constant density servo pattern. The servo information is accordingly arranged on the disc as a plurality of servo strips extending radially from an inner to an outer diameter of the disc. Each servo strip comprises a plurality of servo fields, with each servo field associated with a selected one of the tracks on the disc. Preferably, each of the servo fields is of uniform length.

The servo information is written by a servo track writing system which generates a fixed frequency pattern clock signal that indicates the appropriate angular locations on the disc at which the servo information should be written. The servo track writing system includes a servo write clock circuit which generates a servo write clock signal having a selectively variable frequency, and a pattern generator which generates and outputs the servo information at the selected frequency of the servo write clock signal at the appropriate times indicated by the pattern clock signal. To do so, the pattern generator outputs a reset pulse to the servo write clock circuit which temporarily suspends and restarts the servo write clock circuit so that the servo write clock signal and the pattern clock signal are in phase at the initiation of the output of the servo information.

These and various other features as well as advantages which characterize the present invention will be apparent from a reading of the following detailed description and a review of the associated drawings.

BRIEF DESCRIPTION OF THE DRAWINGS

FIG. 2 is a functional block diagram of the disc drive of FIG. 1.

FIG. 3 provides a representation of a plurality of servo wedges on a portion of a prior art disc, illustrating the manner in which servo information is stored in accordance with the prior art.

FIG. 4 illustrates a servo field disposed at an outer radius of the prior art disc of FIG. 3.

FIG. 5 illustrates a servo field disposed at an inner radius of the prior art disc of FIG. 3.

FIG. 6 provides a representation of a portion of one of the discs of the disc drive of FIG. 1, illustrating the servo information arranged as a plurality of constant density servo strips on the disc in accordance with the present invention.

FIG. 7 illustrates a servo field disposed at an outer radius of the disc of FIG. 6.

FIG. 8 illustrates a servo field disposed at an inner radius of the disc of FIG. 6.

FIG. 13 provides a flow chart for a CONSTANT DENSITY STW routine, generally illustrating the steps carried out to write the servo information to the discs of the disc drive in accordance with the present invention.

DETAILED DESCRIPTION

Figure 1:
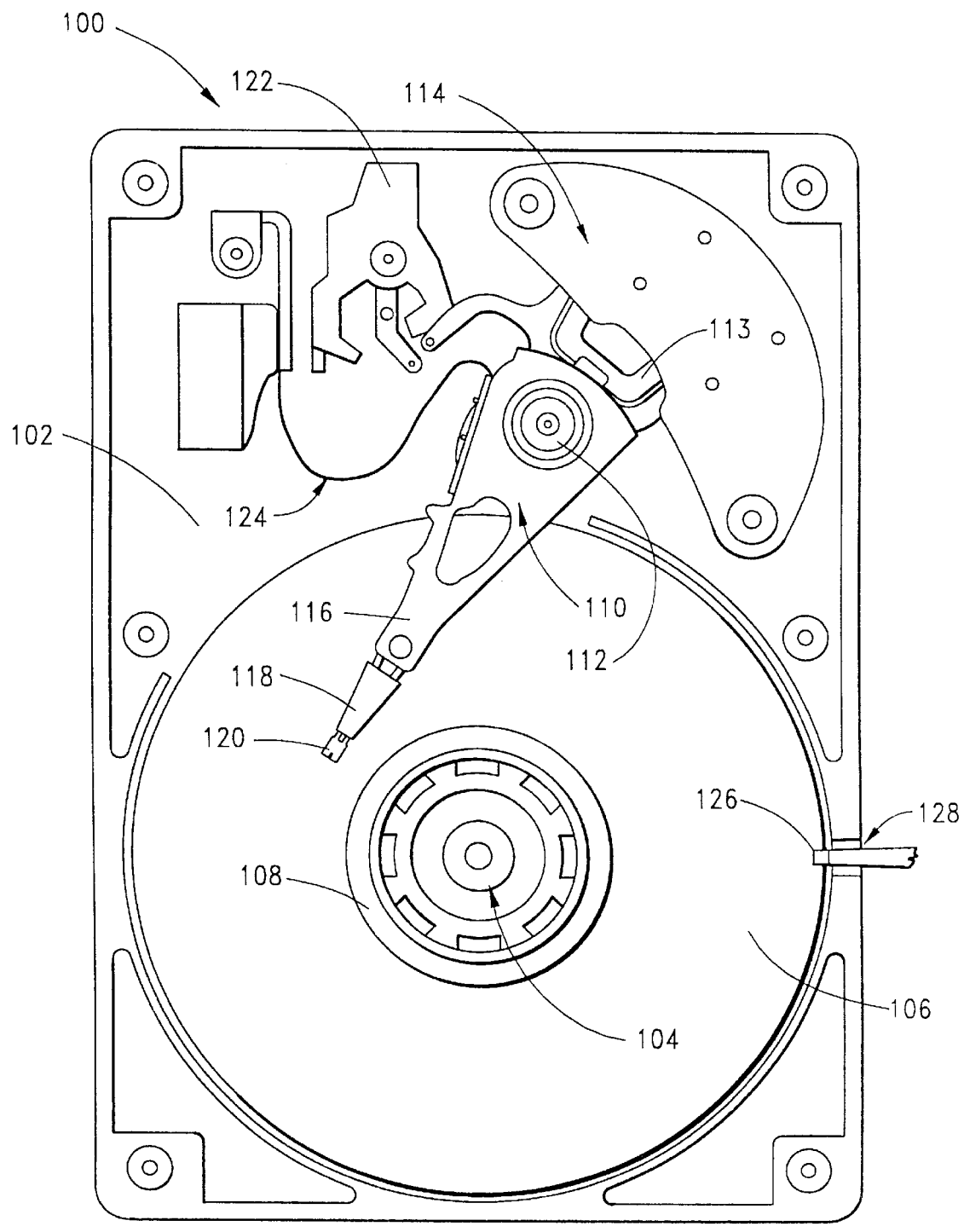
FIG. 1 provides a top plan view of a disc drive constructed in accordance with a preferred embodiment of the present invention.

Turning now to the drawings and more particularly to FIG. 1, shown therein is a top plan view of a disc drive constructed in accordance with the present invention and generally denoted at 100.

The disc drive 100 includes a base deck 102 to which various disc drive components are mounted. A top cover, which has been omitted from FIG. 1 to facilitate the present discussion, cooperates with the base deck 102 to form an internal, sealed environment for the disc drive 100. A spindle motor 104 is provided to rotate a stack of discs 106 at a constant high speed, with a disc clamp 108 securing the discs 106 to the spindle motor 104.

To transfer data to and from the discs 106, a controllably positionable actuator assembly 110 is provided which rotates about a cartridge bearing assembly 112 in response to currents applied to a coil (a portion of which is shown at 113) of a voice coil motor (VCM) 114. The actuator assembly 110 includes a plurality of arms 116 from which corresponding flexure assemblies 118 extend. Heads 120 are provided at distal ends of the flexure assemblies 118 and are supported over the discs 106 by air bearings established by air currents set up by the rotation of the discs 106. A latch assembly 122 is provided to secure the heads over landing zones (not designated) at the innermost diameters of the discs 106 when the disc drive 100 is deactivated. A flex circuit assembly 124 provides electrical communication paths between the actuator assembly 110 and a disc drive printed circuit board (not shown) mounted to the underside of the disc drive 100 in a conventional manner.

As explained in greater detail below, servo information is written to the discs 106 during a servo track writing operation during the manufacture of the disc drive 100. During this process, as shown in FIG. 1 a clock head 126 is inserted through an opening 128 in the side of the base deck 102 to write a clock track at the outermost radius of one of the discs 106. The clock head 126 is not a part of the disc drive 100; rather, the clock head 126 is removed once the servo track writing operation is completed, after which the opening 128 is sealed using a conventional adhesive seal (not shown) applied to the exterior surface of the base deck 102.

Referring now to FIG. 2, shown therein is a functional block diagram of the disc drive 100 of FIG. 1, generally illustrating the main functional circuits used to control the operation of the disc drive 100. It will be understood that the circuitry of FIG. 1 substantially resides on the aforementioned disc drive printed circuit board.

As shown in FIG. 2, the disc drive 100 is operably connected to a host computer 130 in which the disc drive 100 is mounted in a conventional manner. A disc drive control processor 132 provides top level control of the operation of the disc drive 100 and facilitates data transfer between the host computer 130 and the discs 106. Programming and information utilized by the control processor 132 are provided in both volatile and non-volatile memory devices such as a dynamic random access memory (DRAM) device 134 and a flash memory device 136.

An interface circuit 140 includes a data buffer (not separately shown) for the temporary buffering of data between the host computer 130 and the discs 106 and a sequencer (also not separately shown) that directs the operation of the disc drive 100 during data transfer operations. More particularly, during a write operation data are passed from the host computer to a read/write channel 142 which applies the necessary encoding, timing and serialization operations to enable a preamp/driver circuit 144 to apply write currents to the head 120 in order to write the data to the disc 106. During a read operation, read bias currents are passed through a magneto-resistive (MR) read element of the head 120, enabling the preamp/driver circuit 144 to provide readback signals to the read/write channel 142 to reconstruct and transfer the previously stored data to the host computer 130.

Continuing with FIG. 2, a spindle circuit 146 is provided to control the rotation of the discs 106 through back electromagnetic force (bemf) commutation of the spindle motor 104 in a conventional manner. During normal operation of the disc drive 100 the discs 106 are rotated at a constant high speed, such as 10,000 revolutions per minute.

Finally, a servo circuit 148 is provided to control the position of the heads 120 relative to the discs 106. Servo information on the discs 106 is read by the heads 120 and provided to the servo circuit 148 by way of the preamp driver 144.

During a seek operation wherein a selected head 120 is moved from an initial track to a destination track, a velocity profile is used to define the optimum velocity trajectory for the head. During the seek, current is applied to the coil 113 by the servo circuit 148 in order to accelerate and then decelerate the head 120 toward the destination track. As the head 120 is moved across the disc surface, the servo information is read and provided to the servo circuit 148 in order to obtain head velocity measurements, and adjustments are made to the applied current in response to the difference between the measured velocity and the velocity profile.

During track following wherein a selected head 120 is caused to follow a selected track, the servo circuit 148 uses positional information from the servo information to modulate the current applied to the coil to maintain the head 120 in a fixed relation with the selected track. The construction and operation of servo circuits such as 148 are discussed, for example, in U.S. Pat. No. 5,262,907 issued Nov. 16, 1993 to Duffy et al. (hereinafter "Duffy '907"), assigned to the assignee of the present invention.

Referring now to FIG. 3, shown therein is a generalized representation of the manner in which the servo information is written in accordance with the prior art. Particularly, a portion of a prior art disc 150 is represented in FIG. 3, with the disc 150 including a number of servo wedges (one of which is identified at 152), each servo wedge radially extending from the inner to the outer radius of the disc 150 and comprising the servo information used to control the position of an associated head (not shown) in relation to the disc surface.

Because all of the servo information is written at the same frequency, the width of the servo wedge 152 increases with disc radius. Particularly, with reference to prior art FIGS. 4 and 5, a servo field 154 (FIG. 4) disposed at the outermost radius of the disc 150 along the servo wedge 152 is substantially longer than a servo field 156 (FIG. 5) disposed at the innermost radius of the disc 150. Although various servo formats are known in the art, the servo fields 154, 156 are shown to comprise automatic gain control (AGC), synchronization (S), Gray code (GC), index (I) and position (POS) fields, the format and use of which are well known and discussed in Duffy '907.

By contrast, the present invention contemplates the writing of the servo information at a varying frequency so as to achieve a substantially constant bit density and uniformly sized servo fields with respect to disc radius. Particularly, FIG. 6 provides a generalized representation of one of the discs 106 of the disc drive 100 having a plurality of constant density servo strips (one of which is designated at 162), each servo strip comprising the servo information utilized by the servo circuit 148. For reference, each of the discs 106 preferably has 78 servo strips on each of the disc surfaces.

As shown in FIGS. 6–8, the servo strip 162 has a substantially uniform width with respect to disc radius, so that a servo field 164 (FIG. 7) disposed at the outermost radius of the disc 106 along the servo strip 162 is substantially the same size as a servo field 166 (FIG. 8) disposed at the innermost radius of the disc 106. Accordingly, the frequency at which the servo information stored in the outermost servo field 164 is substantially greater than the frequency used to write the servo information stored in the innermost servo field 166. The manner in which this is preferably accomplished will now be discussed.

Figure 9:
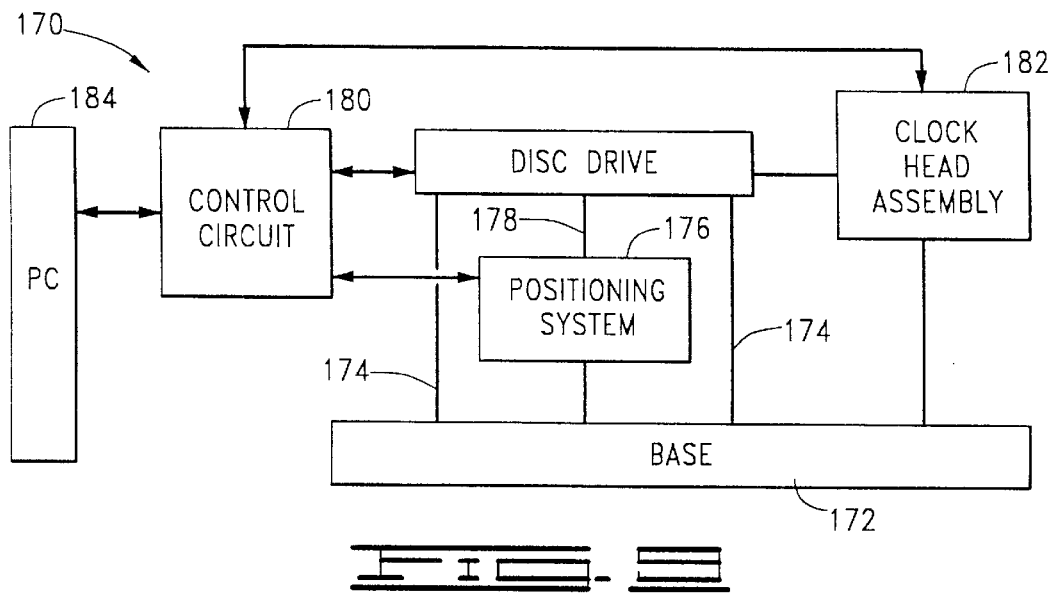
FIG. 9 provides a functional block representation of the disc drive of FIG. 1 in conjunction with a servo track writing system which is used to write the servo information to the discs of the disc drive in accordance with the present invention.

Referring to FIG. 9, shown therein is a functional block representation of the disc drive 100 in conjunction with a servo track writing (STW) system 170 utilized to generate the constant density servo strips shown in FIG. 6. As with conventional STW practices, the aforementioned disc drive printed circuit board is not attached to the disc drive 100 during the STW process in order to facilitate access to various components of the disc drive 100 by the servo track writing system 170.

The STW system 170 generally resembles similar STW systems of the prior art and contains various components familiar to those skilled in the art. Accordingly, a general overview of the STW system 170 will first be presented, after which the novel operational features of the STW system 170 will be discussed.

As shown in FIG. 9, the STW system 170 comprises a base 172, such as a granite block having a calibrated surface, which serves as a mechanical reference for the STW system 170. The disc drive 100 is mounted relative to the base 172 using a conventional mounting fixture arrangement (represented schematically at 174). A closed-loop positioning system 176 is disposed between the disc drive 100 and the base 172 to control the position of the heads 120 (FIG. 1) during the STW process. For reference, the positioning system 176 preferably includes a pusher pin (represented schematically at 178) which extends upwardly through a corresponding opening (not shown) in the base deck 102 in order to engage the actuator arms 116 (FIG. 1) of the actuator assembly 110 (FIG. 1), the pusher pin 178 advancing the radial position of the heads 120 during the STW process. A laser based detector (not separately designated) detects the position of the pusher pin 178 in order to provide closed-loop control the placement of the heads 120 relative to the discs 106. A suitable positioning system such as 176 has been commercially disclosed as Model No. 137K15, manufactured by Teletrak Inc. of Santa Barbara, Calif. However, other methodologies for controlling the advancement and position of the actuator arms 116 are known in the art. One such methodology involves the direct application of current to the coil 113 (FIG. 1) by the STW system 170, thereby utilizing the VCM 114 of the disc drive 100 to position the heads 120. In such a case a laser based system observes the radial positioning of the actuator arms 116 through an opening in the base deck 102.

The STW system 170 further comprises a control circuit 180 which is operably coupled to the positioning system 176 and the disc drive 100. The control circuit 180 directs the operation of the positioning system 176 and transfers the servo information to the heads 120 in order to write the servo strips (such as 162 of FIG. 6) on each of the discs 106. The control circuit 180 emulates a substantial portion of the functionality of the disc drive printed circuit board in order to carry out the necessary disc drive functions to accomplish the writing of the servo information, including the rotation of the spindle motor 104 and the transfer of the servo information to the heads 120. As discussed below, the control circuit 180 further communicates with a clock head assembly 182 which includes the aforementioned clock head 126 (as shown in FIG. 1). A personal computer (PC) 184 is further provided to control the overall operation of the STW system 170 and to serve as a conventional user interface. As desired, the control circuit 180 can be configured so as to reside in an expansion slot of the PC 184, or can be mounted externally to the PC 184.

Before discussing relevant portions of the control circuit 184, it will first be understood that, in a manner similar as performed in the prior art, the clock head 126 is inserted through the base deck opening 128 so as to be adjacent the extreme, outside edge of a selected surface of one of the discs 106 at a radial position beyond a recording band (not designated in the drawings) of the discs 106. Once located, the control circuit 184 instructs the clock head assembly 182 to write, by way of the clock head 126, a clock track on the selected surface as the control circuit 180 causes rotation of the discs 106 at a selected rotational speed which is nominally the same rotational speed at which the servo information will be written. The clock track comprises a sequence of alternating pulses at a selected frequency which are subsequently read by the clock head 126 to generate a reference clock signal used to control the timing of the writing of the servo information to the discs 106.

As discussed above, in accordance with the present invention the servo information is written to the discs 106 at a varying frequency to achieve a constant bit-density, which means that the frequency at which the servo information is written will vary with respect to each of the tracks on the discs 106. Thus, the STW system 170 cannot use the fixed frequency reference clock signal read from the clock head 126 as the servo write clock frequency for each track. Moreover, it is desirable that each of the servo fields (such as 164, 166 of FIGS. 7–8) of each of the servo strips (such as 162 of FIG. 6) have leading edges that are angularly aligned.

Figure 10:
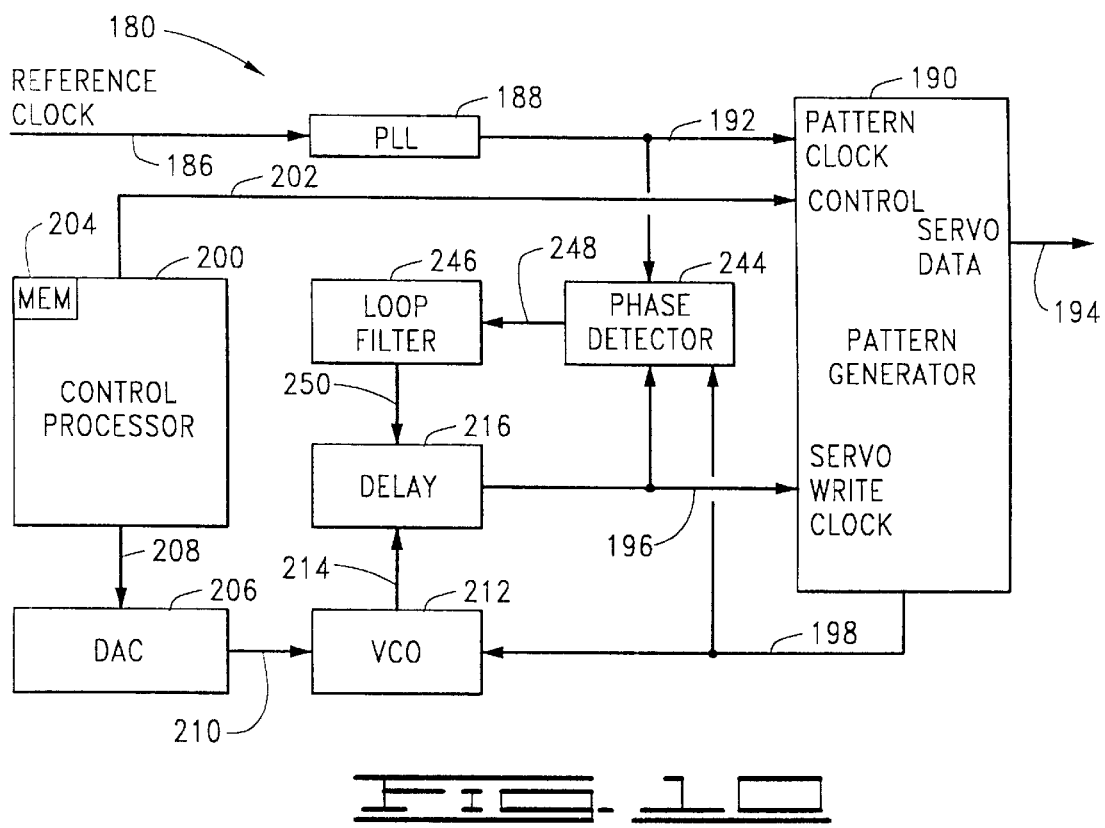
FIG. 10 provides a functional block representation of a portion of the control circuit of the servo track writing system of FIG. 9.

Accordingly, FIG. 10 provides a functional block diagram of the control circuit 180, which as explained below generates a variable frequency servo write clock and phase locks leading edges of the variable frequency servo write clock with the fixed frequency reference clock. For purposes of clarity, conventional portions of the control circuit 180 have been omitted from FIG. 10, such conventional portions being utilized to control the rotation of the spindle motor 104, the positioning of the actuator arms 116 and the transfer of the servo information to the discs 106, all of which continue to occur in a known manner.

With reference to FIG. 10, the reference clock signal from the clock head assembly 182 of FIG. 9 is provided on signal path 186 to a phase locked loop (PLL) 188 which, in response thereto, outputs a pattern clock signal to a pattern generator 190 by way of signal path 192. The PLL 188 preferably includes divider circuitry (not separately shown) so that the frequency of the reference clock is a selected multiple of the frequency of the pattern clock.

As discussed more fully below, the pattern generator 190 assembles and outputs the servo information to be written to the servo fields (such as 164, 166 of FIGS. 7–8) on output path 194. In this regard, the pattern generator 190 operates in a manner similar to pattern generators of the prior art, in that the pattern generator 190 provides the necessary data to write the AGC, synchronization, Gray code, index and position field information stored in each of the servo fields on the discs 106, at the rate of one-half track at a time (i.e., each servo field is written over two rotations of the discs 106). Unlike pattern generators of the prior art, however, the pattern generator 190 is provided with the additional capability of writing this servo information at a frequency indicated by a servo write clock signal provided on input signal path 196, generated as discussed below, and outputs a zero pulse reset (ZPR) signal on path 198 to properly time the writing of the servo fields. Accordingly, the pattern generator 190 can be constructed from a programmable microcontroller, a state machine or other known circuitry configurations useful for these purposes. The servo information output on path 194 is provided to the preamp/driver circuit 144 (FIG. 2) which generates the necessary write currents to enable the head 120 to write the servo information to the disc 106.

Control inputs are additionally shown to be provided to the pattern generator 190 by a control processor 200 (by way of signal path 202) which controls the operation of the pattern generator 190. For reference, the control processor 200 further controls remaining portions (not shown) of the control circuit 180 in a manner similar to that of the control processor 132 of FIG. 2 such as, for example, providing the necessary inputs to cause the spindle motor 104 to rotate the discs 106 at the selected rotational speed. The control processor 200 additionally serves to provide top level control for the positioning system 176 (FIG. 9) and interfaces with the PC 184 (FIG. 9). Memory (MEM) provided to store programming utilized by the control processor 200 is generally indicated at 204.

To generate the servo write clock signal on path 196, a digital to analog converter (DAC) 206 receives a digital input value on path 208 from the control processor 200, with the digital input value being indicative of the desired frequency at which the servo information is to be written. The DAC 206 converts the digital input value to an analog form which is provided on path 210 to a voltage controlled oscillator (VCO) 212. The VCO 212 outputs (on path 214) a clock signal having a frequency determined by the analog input on the path 210. A relatively small timing delay is applied to the clock signal by a tunable delay block 216, the output of which comprises the servo write clock signal on the path 196. Thus, during operation the control processor 200 establishes the variable servo write frequency by controllably varying the digital input value on path 208 in relation to the radial position of the head 120 (with respect to the corresponding disc 106). The DAC 206 should be of sufficient resolution to facilitate different servo write clock frequencies for each track on the discs 106.

Figure 11:
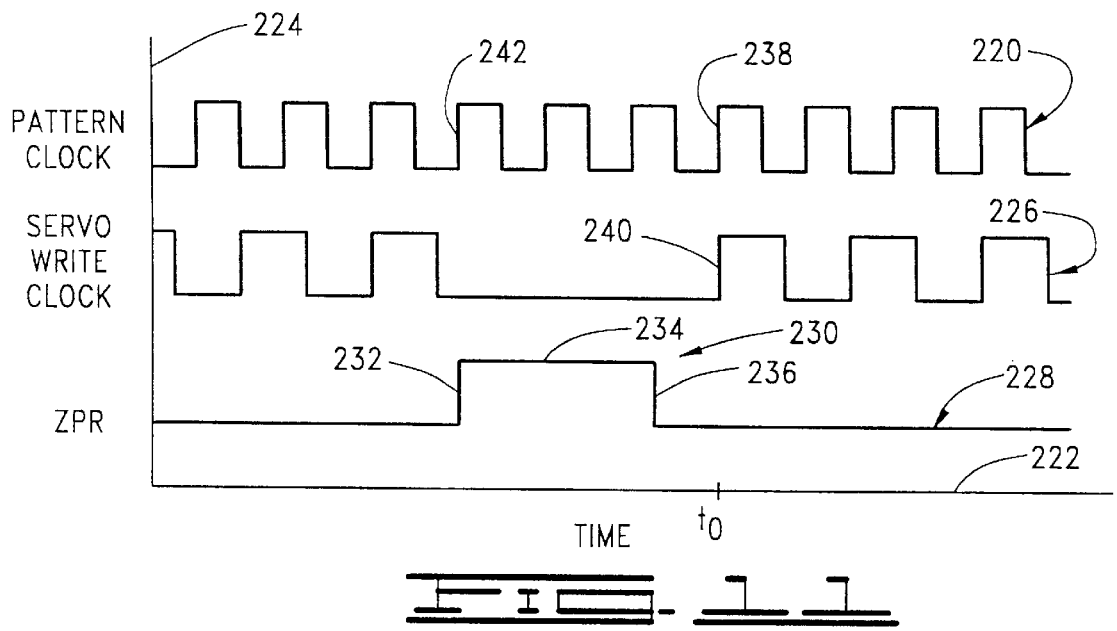
FIG. 11 provides a timing diagram illustrating the timing of various signals generated by the circuit of FIG. 10 relating to the writing of the servo field of FIG. 8.

To further explain the operation of the circuit of FIG. 10, a timing diagram as set forth by FIG. 11 provides graphical representations of the timing of various signals used to initiate the writing of the servo information. Particularly, FIG. 11 is contemplated as representing the writing of the servo field 166 (FIG. 8) which, as discussed above, is disposed at the innermost radius of the servo strip 162 (FIG. 6).

FIG. 11 first shows a portion of a pattern clock signal 220 which is obtained through the operation of the clock head 126 (FIG. 1) and is provided to the pattern generator 190 (via path 192). For reference, the timing diagram of FIG. 11 is plotted against an x-axis 222 indicative of elapsed time and a y-axis 224 indicative of signal amplitude.

The frequency at which the servo field 166 is written is determined by a servo write clock signal 226, which is provided to the pattern generator 190 (via path 196) in response to the digital input value applied to the DAC 206 by the control processor 200. A zero phase reference (ZPR) signal 228 is further shown in FIG. 11, the ZPR signal 228 generated by the pattern generator 190 and output on path 198 in order to initiate the writing of the servo field 166 at the appropriate time.

The ZPR signal 228 is a normally low level signal with periodic high level reset pulses, one of which is shown at 230, with each reset pulse initiating the writing of a portion of one of the servo strips (such as 162 in FIG. 6). More particularly, the reset pulse 230 includes a rising edge 232, a high level portion 234 and a falling edge 236, so that when the ZPR signal 228 goes high, the operation of the VCO 212 (FIG. 10) is temporarily suspended; that is, the servo write clock 226 takes a low state subsequent to the detection of the rising edge 232. Although FIG. 11 shows the servo write clock signal 226 to already be at a low state in its cycle when the rising edge 232 occurs, it will be understood that, should the rising edge 232 occur when the servo write clock signal 226 is at a high state in its cycle, the VCO 212 will complete the pending cycle before temporarily suspending its operation.

It will be noted that the objective of the circuit of FIG. 10 is to initiate the writing of the servo field 166 at time $t_0$) which is defined by a selected rising edge 238 of the pattern clock signal 220. Thus, the purpose of the reset pulse 230 is to enable the servo write clock signal 226 to initiate the clocking of the servo data at time $t_0$, so that rising edge 240 of the servo write clock 226 nominally coincides with the rising edge 238 of the pattern clock signal 220. In order to accomplish this, the rising edge 232 of the reset pulse 230 is provided a selected amount of time before time $t_0$, such as for example a predetermined number of clock pattern cycles before $t_0$, as indicated by rising edge 242 of the pattern clock signal 220.

The timing of the falling edge 236 of the reset pulse 230 is further selected to enable the VCO 212 to commence operation such that the first rising edge 240 occurs at $t_0$. As will be recognized, VCOs such as represented at 212 typically do not commence operation instantaneously upon enablement, but rather require a small amount of time to initiate operation, this time being characteristic of the construction of the VCO. Accordingly, because this time can be determined through evaluation of the VCO 212, and because the time between rising edges 242 and 238 of the pattern clock signal 220 is known, the pattern generator 190 can readily determine the required pulse length for the reset pulse 230 and provide the falling edge 236 at a time sufficient to obtain nominal phase lock between the pattern clock signal 220 and the servo write clock signal 226 at time $t_0$.

Referring again to FIG. 10, it will now be recognized that a small correction loop is provided to ensure that the pattern clock signal 220 (on path 192) is correctly synchronized with the servo write clock signal 226 (on path 196), the loop comprising a phase detector 244 and a loop filter 246. During operation the phase detector 244 is enabled with the falling edge 236 of the ZPR signal 228 on path 198 and outputs, via path 248 to the loop filter 246, a signal indicative of the phase error between the edges 238 and 240. The loop filter 246 cumulatively conditions (via integration or similar methodology) the phase error in order to provide an input on path 250 to set the delay of the delay block 216 sufficiently to compensate for this phase error. Thus, the delay of the delay block 216 is relatively very small and is continuously adjusted so as to minimize the phase error between the rising edges 238 and 240 of the pattern clock signal 220 and the servo write clock signal 226, respectively.

Figure 12:
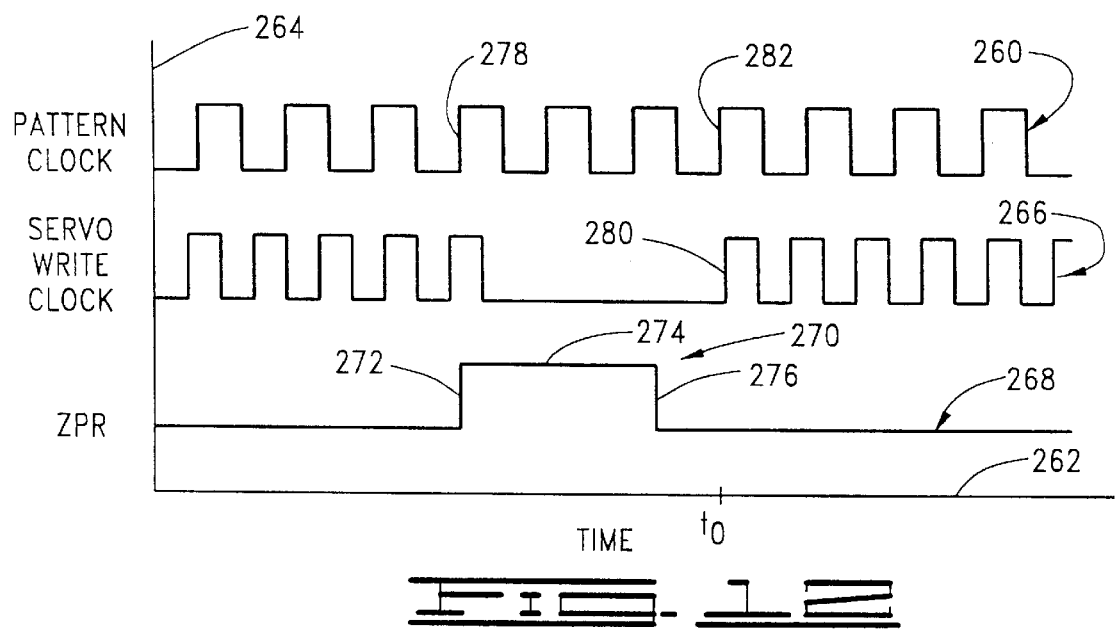
FIG. 12 provides a timing diagram illustrating the timing of various signals generated by the circuit of FIG. 10 relating to the writing of the servo field of FIG. 7.

Referring now to FIG. 12, shown therein is another timing diagram representative of various signals used to initiate the writing of the servo information to the servo strips of FIG. 6. More particularly, FIG. 12 has been provided to represent steps taken to initiate the writing of the servo block 164 of FIG. 7, which is disposed at the outer radius of the servo strip 162 of FIG. 6. As will be recognized, the frequency at which the servo block 164 is written will be substantially greater than the frequency at which the servo block 166 is written, but generally the same approach used to write the lower frequency servo block 166 is used to write the higher frequency servo block 164.

As shown in FIG. 12, a portion of a pattern clock signal 260 is represented against an x-axis 262 indicative of elapsed time and a y-axis 264 indicative of signal amplitude. The pattern clock signal 260 has the same frequency and is obtained in the same manner as the pattern clock signal 220 of FIG. 11, and is likewise provided to the pattern generator 190 on path 192.

A servo write clock signal 266 is also provided in FIG. 12, the servo write clock signal 266 generated in a manner similar to that of the servo write clock signal 226 of FIG. 11, except that the servo write clock signal 266 of FIG. 12 is at a substantially higher frequency than that of the servo write clock signal 226 of FIG. 11. This higher frequency is obtained through the inputting of a larger digital input value to the DAC 206 by the control processor 200. For reference, it will be noted that the timing diagrams of FIGS. 11 and 12 are generalized representations and that the actual frequency variations between the servo write clock signals 226, 266 for servo fields 166, 164 at the inner and outer radii of the disc 106 may be different than that shown. An example frequency range for the writing of the servo information is from about 25 megahertz (MHZ) at the inner radius of the disc 106 up to about 50 MHZ at the outer radius, with the frequency linearly incremented each half-track.

As with FIG. 11, FIG. 12 is further provided with a zero pulse reset (ZPR) signal 268 which includes a plurality of reset pulses, one of which is shown at 270. The reset pulse 270 is used to initiate the writing of the servo field 164 at a desired time $t_0$ to and includes a rising edge 272, a high level portion 274 and a falling edge 276. Accordingly, during operation the rising edge 272 of the ZPR signal 268 is provided in response to a selected rising edge 278 of the pattern clock 260, causing a temporary suspension in the operation of the VCO 212. The falling edge 276 of the ZPR signal 268 subsequently enables the VCO 212, causing the servo write clock signal 266 to initiate a first rising edge 280 at time $t_0$ concurrently with a corresponding rising edge 282 of the pattern clock signal 260.

Turning now to FIG. 13, shown therein is a flow chart for a CONSTANT DENSITY STW ROUTINE 300, illustrating the steps used to write the servo information to the discs 106 of the disc drive 100 in accordance with the foregoing discussion. It is contemplated that suitable programming stored in the PC 184 (FIG. 9) and the MEM 204 used by the control processor 200 (FIG. 10) can be readily provided to carry out the functions specified by FIG. 13.

As shown by block 302 of FIG. 12, the disc drive 100 is first mounted to the STW system 170 (FIG. 9), after which the control circuitspindle motor 104 (Fspindle motor 104 (FIG. 1) to rotate the discs 106 at the selected rotational speed at which the servo information is to be written and the clock track is written to a selected disc 106 by the clock head 126, as indicated by block 304. As will be recognized, the clock track enables the fixed frequency pattern clock signal (such as 220, 260 of FIGS. 11–12) to be provided on path 192 to the pattern generator 190. A conventional index marker is included in the writing of the clock track so as to facilitate accurate determination of the angular position of the discs 106 during the STW process.

The initial servo write clock frequency is next selected, block 306, through determination of the appropriate digital input value to be applied to the DAC 206 by the control processor 200. It is contemplated that the range of digital input values can be predetermined and stored in the form of a table in the MEM 204. The heads 120 are then positioned by block 308 at the appropriate starting location relative to the discs 106, such as at the outermost radii of the discs 106. As with conventional STW operations, it is contemplated that all of the servo information on each of the discs at a given radius will be written before the heads are advanced by the pusher pin 178. Thus, on each pair of adjacent discs 106, corresponding tracks in the same cylinder will be nominally aligned, but the servo fields on these tracks will be angularly offset.

Once the heads 120 have been initially positioned by the operation of block 308, the first half track of servo information is written to each of the discs 106 by block 310. During the operation of block 310, the locations for the leading edges of each of the servo strips (FIG. 6) are identified relative to the pattern clock signal 220, 260 and the reset pulses 230, 270 of the ZPR signal 228, 268 are output as required to initiate the writing of each of the servo fields at the proper angular locations using the servo write clock signal (such as 226, 266) at the selected frequency.

When all of the servo information at the first position has been written, the heads 120 are advanced by the positioning system 176 to the next radial position (in this case, the second half of the first track) by block 312, after which the servo write clock frequency is incremented, block 314, and the next half track of servo information is written to the discs 106, block 316.

The routine of FIG. 13 next passes to decision block 318, which determines whether all of the servo information has been written; if not, the routine continues back to block 312. Thus, the operations of blocks 312 through 318 are continued until all of the servo information has been written to each of the discs 106, after which the routine ends at block 320.

It will be recognized that an important advantage of the present invention is the additional disc area that becomes available for the storage of user data. For example, the disc 106 of FIG. 6 utilizing constant density servo strips will generally require about 30% less servo overhead (i.e., free up about 30% of the disc surface area used to store servo information) as compared to the prior art disc 150 of FIG. 5. It is true that a small phase error will exist between servo information written to adjacent half-tracks. However, computer simulation results suggest that, for a disc drive with a disc diameter of about 9.50 centimeters (3.74 inches), 125 constant density servo fields per track, 4,134 tracks per centimeter (10,500 tracks per inch) and an inner radius servo write clock frequency of 20 MHZ, the reduction in amplitude (as compared to constant frequency servo) of recovered servo information is around 0.02% and the cumulative timing error for each servo field is around 250 picoseconds, which are well within the servo control capabilities of existing servo circuits (such as 148).

Moreover, it will be recognized that the AGC and synchronization information in each of the servo fields (such as shown in FIGS. 7–8) will enable the servo circuit 148 to be properly configured to receive and decode the servo information from any servo field in the servo strip 162, provided the servo circuit 148 is provided with sufficient bandwidth and resolution to accommodate the frequency range over which the servo information is written, which is well within the ability of those skilled in the art to achieve. For example, read/write channel adjustments to accommodate frequency variations in recorded data are presently performed in disc drives incorporating zone based recording, such as taught by U.S. Pat. No. 4,799,112 issued Jan. 17, 1989 to Bremmer et al., assigned to the assignee of the present invention.

Finally, whereas the discussion provided above has been directed to a constant bit-density recording methodology so that each of the servo fields in the servo strips have a uniform length, it is readily contemplated that non-linear increments in servo write clock frequency could be alternatively applied to optimize drive operational characteristics, depending upon the requirements of a given application. For example, the frequency could be varied so as to cause the width of a servo strip to decrease from the inner to the outer radius on a disc.

Accordingly, in view of the foregoing discussion it will be recognized that the present invention is directed to a disc drive (such as 100) having a rotatable disc (such as 106) upon which servo information is stored, the servo information used to control the position of an associated head (such as 120) with respect to the disc.

The servo information is written at a frequency that varies for each track on the disc and is arranged as a plurality of servo strips (such as 162) extending radially from an inner to an outer diameter of the disc, each servo strip comprising a plurality of servo fields (such as 164, 166), each servo field defining a track on the disc. Preferably, each of the servo fields is of uniform length.

The servo information is preferably written by a servo track writing system (such as 170) which generates a fixed frequency pattern clock signal (such as 220, 260) that indicates the appropriate angular locations on the disc at which the servo information is to be written. The servo track writing system includes a servo write clock circuit (such as 200, 206, 212) which generates a servo write clock signal having a selectively variable frequency, and a pattern generator (such as 190) which generates and outputs the servo information at the selected frequency of the servo write clock signal at the appropriate times indicated by the pattern clock signal. To do so, the pattern generator outputs a reset pulse (such as 230, 270) to the servo write clock circuit which temporarily suspends and restarts the servo write clock circuit so that selected edges (such as 238, 240 and 280, 282) of the servo write clock signal and the pattern clock signal are in phase at the initiation of the output of the servo information.

It will be clear that the present invention is well adapted to attain the ends and advantages mentioned as well as those inherent therein. While a presently preferred embodiment has been described for purposes of this disclosure, numerous changes may be made which will readily suggest themselves to those skilled in the art and which are encompassed in the spirit of the invention disclosed and as defined in the appended claims.

What is claimed is:

1. In a disc drive of the type having a rotatable disc, a controllably positionable head adjacent the disc and a servo circuit for controlling the position of the head relative to tracks on the disc defined from servo information on the disc, a method for writing the servo information to the disc, comprising steps of:

(a) generating a fixed frequency pattern clock signal which identifies angular locations on the disc at which the servo information is to be written;

(b) generating a servo write clock signal at a selectively variable frequency; and (c) using the servo write clock signal to clock the writing of the servo information to the disc at the angular locations identified by the pattern clock signal, the variable frequency of the servo write clock signal selected so as to be different for each of the tracks defined on the disc.

2. The method of claim 1, wherein step (a) comprises steps of:

(i) writing a clock track on the disc using an externally applied clock head;

(ii) using the clock head to read the clock track to generate a readback signal; and (iii) using the readback signal to generate the fixed frequency pattern clock signal.

3. The method of claim 1, wherein step (b) comprises steps of:

(i) applying an input control value to a voltage controlled oscillator used in the generation of the servo write clock signal, the frequency of the servo write clock signal being determined by the input control value.

4. The method of claim 3, wherein step (c) comprises steps of:

(i) temporarily suspending operation of the voltage controlled oscillator; and (ii) enabling the voltage controlled oscillator to resume operation such that the servo write clock signal is initially in phase with the fixed frequency pattern clock signal at each of the angular locations at which the servo information is written.

5. A method for writing servo information to a rotatable disc of a disc drive so as to arrange the servo information as a plurality of servo strips which radially extend from an inner to an outer diameter of the disc, each servo strip comprising a plurality of adjacently disposed servo fields at selected radial locations on the disc to define a plurality of concentric tracks on the disc, the method comprising steps of:

(a) generating a constant frequency pattern clock signal indicative of angular positions on the disc at which writing of the servo fields is to be initiated;

(b) generating a selectively variable frequency servo write clock signal for clocking the writing of each of the servo fields at a selectively variable frequency determined in relation to the radial location at which each of the servo fields is to be written so that each of the servo fields in each servo strip is written at a different frequency; and (c) writing the servo fields at the angular positions identified by the pattern clock signal and at the selectively variable frequency of the servo write clock signal.

6. The method of claim 5, wherein step (a) comprises steps of:

(i) writing a clock track on the disc using an externally applied clock head;

(ii) using the clock head to read the clock track to generate a readback signal; and (iii) using the readback signal to generate the fixed frequency pattern clock signal.

7. The method of claim 5, wherein step (b) comprises steps of:

(i) applying an input control value to a voltage controlled oscillator used in the generation of the servo write clock signal, the input control value determining the frequency of the servo write clock signal.

8. The method of claim 7, wherein step (c) comprises steps of:

(i) temporarily suspending operation of the voltage controlled oscillator;

(ii) enabling the voltage controlled oscillator to resume operation such that the servo write clock signal is initially in phase with the fixed frequency pattern clock signal at each of the angular locations at which the servo information is written.

9. The method of claim 5, wherein the pattern clock signal and the servo write clock signal each comprise a series of transitional edges, wherein a first, selected transitional edge of the servo write clock signal corresponds to initiation of the writing of a selected servo field, wherein a second, selected transitional edge of the pattern clock signal corresponds to the angular location at which the selected servo field is to be written, and wherein the first, selected transitional edge is aligned with the second, selected transitional edge at the initiation of the writing of the selected servo field.

10. The method of claim 9, wherein phase error between the first and second, selected transitional edges is determined and used to adjust the servo write clock signal.

11. A servo track writing system for writing servo information to a rotatable disc of a disc drive, the servo information defining tracks on the disc and used to control the position of a disc drive head associated with the disc, the servo track writing system comprising:

a clock head assembly, operably coupled to the disc drive, which writes a fixed frequency clock track to the disc;

a control circuit, operably coupled to the clock head assembly, which controls writing of the servo information to the disc by the disc drive head, the control circuit comprising:

a pattern clock circuit, responsive to the clock head assembly, which provides a fixed frequency pattern clock signal;

a servo write clock circuit which provides a variable frequency servo write clock signal; and a pattern generator circuit, responsive to the pattern clock circuit and the servo write clock circuit, which generates and outputs the servo information at a frequency corresponding to the frequency of the servo write clock signal and at a time determined by the fixed frequency pattern clock signal, wherein the frequency of the servo information is different for each of the tracks on the disc.

12. The servo track writing system of claim 11, wherein the pattern generator circuit temporarily suspends operation of the servo write clock circuit and then restarts the operation of the servo write clock circuit before the writing of a selected portion of the servo information so as to cause the pattern clock signal and the servo write clock signal to be in phase at the initiation of the writing of the selected portion of the servo information.

13. The servo track writing system of claim 12, further comprising a phase detector responsive to the pattern clock circuit and the servo write clock circuit, which identifies phase error between the pattern clock signal and the servo write clock signal at the initiation of the writing of the selected portion of the servo information and adjusts the operation of the servo write clock circuit to minimize such phase error.

14. The servo track writing system of claim 11, wherein the servo write clock circuit comprises a voltage controlled oscillator which determines the frequency of the servo write clock signal in response to a control input applied to the voltage controlled oscillator.

15. The servo track writing system of claim 11, wherein the servo information is written at a constant density on the disc.

* * * * *

UNITED STATES PATENT AND TRADEMARK OFFICE
CERTIFICATE OF CORRECTION

PATENT NO. : 6,084,738
DATED : July 4, 2000
INVENTOR(S) : Dennis Daniel Duffy

It is certified that error appears in the above-identified patent and that said Letters Patent is hereby corrected as shown below:

Column 2,
Line 44, replace "disc drives, have" with -- disc drives have --.
Line 64, replace " '603employs" with -- '603 employs --.

Column 9,
Line 58, replace "time $t_o$)" with -- time $t_o$ --

Column 11,
Line 31, replace "the control circuitspindle motor 104 (Fspindle motor 104" with -- the control circuit 180 instructs the spindle motor 104 --.

Signed and Sealed this

Sixth Day of August, 2002

Attest:

JAMES E. ROGAN
Attesting Officer
Director of the United States Patent and Trademark Office